United States Patent [19]

Gunzinger

[11] Patent Number: 5,671,430

[45] Date of Patent: Sep. 23, 1997

[54] PARALLEL DATA PROCESSING SYSTEM WITH COMMUNICATION APPARATUS CONTROL

[76] Inventor: Anton Gunzinger, Ottenweg 12, 8008 Zürich, Switzerland

[21] Appl. No.: 392,786

[22] PCT Filed: Jun. 24, 1994

[86] PCT No.: PCT/CH94/00133

§ 371 Date: Mar. 22, 1995

§ 102(e) Date: Mar. 22, 1995

[87] PCT Pub. No.: WO95/01604

PCT Pub. Date: Jan. 12, 1995

[30] Foreign Application Priority Data

Jun. 30, 1993 [CH] Switzerland .................. 01972/93

[51] Int. Cl.$^6$ .................................................. G06F 13/00
[52] U.S. Cl. .................. 395/800; 395/650; 364/229.2; 364/230.3; 364/238.3; 364/DIG. 1
[58] Field of Search .................. 395/800, 200.08, 395/200.15, 856, 287, 309, 474, 650, 726, 728; 364/131–134; 370/85.1, 85.13, 94.1; 340/825.5

[56] References Cited

U.S. PATENT DOCUMENTS

| | | | |
|---|---|---|---|
| 4,631,667 | 12/1986 | Zulian et al. | 395/307 |
| 4,873,626 | 10/1989 | Gifford | 395/800 |
| 5,321,825 | 6/1994 | Song | 395/490 |
| 5,390,336 | 2/1995 | Hillis | 395/800 |
| 5,423,008 | 6/1995 | Young et al. | 395/287 |
| 5,517,656 | 5/1996 | Shi | 395/800 |

OTHER PUBLICATIONS

Hutchinson, Norm et al, "The Flooding Sink—A New Approach to Local Area Networking", *Computer Networks and ISDN Systems*, vol. 11, No. 1, Jan. 1986 (Elseive3r Science Publishers B.V., Amsterdam, Netherlansds, pp. 1–14.

"Parallel Data Transfer Operations", IBM Technical Disclosure Bulletin, vol. 34, No. 10B, Mar. 1992, pp. 245–246.

"Data Structures and Algorithms for Collective Communication Over a Dynamically Determined Set of Processors in Distributed Memory Parallel Computers", IBM Technical Disclosure Bulletin, vol. 35, No. 3, Aug. 1992, pp. 465–470.

*Primary Examiner*—Alpesh M. Shah
*Attorney, Agent, or Firm*—Walter C. Farley

[57] ABSTRACT

A method for interconnecting and operating in parallel a number of autonomous data processors each having a data memory, an instruction memory and a communication interface includes, before beginning a data processing sequence, loading memories of the autonomous data processors with individual algorithms, data sets and protocol instructions. A hardware communication system common to all of the autonomous data processors is connected to communicate with the communication interfaces of all of the data processors to regulate operation of the data processors. The communication system is programmed with an overriding body of execution sequence commands for the data processors to initiate and sequence autonomous processing of data in the data processors. The communication system communicates commands to initiate processing of the loaded data sets in accordance with the loaded algorithms in the data processors, independently of each other, to individually arrive at processing results and make the results available to the communication system, and the communication system reads and communicates the processing results.

21 Claims, 5 Drawing Sheets

PARALLEL DATA PROCESSING SYSTEM WITH COMMUNICATION APPARATUS CONTROL

FIELD OF THE INVENTION

The invention relates to an intelligent communications method, as well as to means for performing the method in multiprocessor systems, e.g. for use in electronic data processing.

BACKGROUND OF THE INVENTION

Nowadays multiprocessor systems are used in increasing numbers of large and small computers and for very varied applications. Thus, e.g. a personal computer is provided with several specialized processors for the operation of the display screen, keyboard, mass memory, etc., i.e. each personal computer is already a multiprocessor system.

Multiprocessor systems are naturally not only used in personal computers, but also in computing-intensive applications, for scientific calculations such as meteorology and fluid mechanics or for digital image processing. Such applications can be very well performed by parallel operating processors, i.e. by means of several or even better a plurality of processors, which are interconnected by means of a communications system. It can therefore be assumed that in future multiprocessor systems will play an important part.

Standard supercomputers such as e.g. the CRAY Y-MP or the NEC SX-3 have computing capacities of several GFLOPS (Billion Floating Point Operations per Second). A single modern processor, such as the intel Processor i860, the PowerPC or the Motorola DSP96002, or also the DEC Alpha only have a computing capacity of up to and above 100 MFLOPS (Million Floating Point Operations per Second). The GFLOP threshold is only reached by a synergy-giving coupling of a larger number of individual processors to form a parallel computer by means of a communications system. This parallel electronic data processing is subject to difficulties in communication and programming. The nature of the information switching (communication) consequently has a great influence on the efficiency and construction of parallel computers.

The communication difficulties are a general problem of and are inherent in multiprocessor systems. In order to obtain a high computing power the maximum number of processors must cooperate. In principle, a distinction can be made between four different architectures.

a) Shared memory, in which all the processors access a single, common memory. The synchronization of the processors takes place with locked and unlocked instructions. The bottleneck in such a system is the common memory. Therefore this architecture is only suitable for multiprocessor systems with a relatively small number of processors.

b) Distributed memory, in which each processor has an individual memory, which can also be accessed by the other processors. Each access consists of a request (address) and the actual data value. In the case of intensive communication with many accesses of several processors the corresponding communications system is rapidly overloaded.

c) Client/server, where a master (client) distributes the tasks and data to several slaves (servers). Such an architecture can only be used if the individual tasks and data have no or only very few interactions with one another, which only occurs with a few applications.

d) Message passing, where the data produced in a processor are supplied by means of a message to all processors interested in said specific data. The number of messages supplied in this communications system can grow in proportion to the square. Therefore this architecture is also unsuitable for tasks with intensive communication and many processors.

These communications systems are characterized by a high management expenditure and low data throughput. As can be gathered from the above remarks, central significance is consequently attached to the transmission protocol. The speed with which the communication can become a bottleneck is e.g. shown by the symmetrical multiprocessor system constituted by the Intel Pentium, in which up to four processors can communicate with one another. The multiprocessor Interconnect (MPI) Communications System used has nine different cycles by means of which the individual processors can converse in accordance with a transmission protocol by means of a jointly used and local memory. The maximum transmission band width is 2.1 Gbits/sec. at 33.3 MHz clock frequency and 64 bit data. The individual pentiums are timed with 60 MHz for 64 bit data and therefore have a maximum transmission bandwidth of 3.8 Gbits/sec. which is higher by a factor of 1.8. When using four pentiums in the multiprocessor system the communications system becomes the eye of a needle, because assuming a linear speed increase, the maximum transmissions bandwidth of the MPI system is only 14% of that of the individual pentium.

SUMMARY OF THE INVENTION

An object of the present invention is to provide an optimum communications method for multiprocessor systems with respect to the transmission speed, utilization of the transmission bandwidth, and control of the communication and to provide suitable means for accomplishing this method.

The idea on which the invention is based consists of reducing the communication to the individual transmission of information. The information not absolutely necessary, but superfluous for the rapid switching of the communication, such as e.g. the determination of the sequence of transmitting and receiving subscribers or participants or the determination of which subscriber or participant is transmitting to whom and which subscriber or participant is receiving from whom, or also the fixing of the time and the packet size of a communication, etc., are "separated" and are consequently not part of the transmission protocol. These separated data are supplied to the participants (the participating processors) as protocol instructions in the form of a timetable (schedule) before the "meeting", they are stored and the processors consequently known beforehand when, how and to whom they are transmitting, when, how and from whom they are receiving, etc., i.e. there is a sharing of the functions. Therefore the transmission protocol is consequently no longer a postman, who runs around with addressed envelopes and looks for letter boxes and instead he comes with an open bag to the participants, which in turn provide the information which is of interest to them. Modern electronic processing also makes it possible to communicate on one or more occasions information in this way. The inventive communications system (postman, timetable and participants) is therefore referred to as intelligent and acts in an autonomous manner, because the individual participants (processors) know their tasks and functions beforehand. The joint communications system is programmable as a whole to an overriding body of execution instructions. The efficient transmission can e.g. be implemented by a purely hardware solution (e.g. an ASIC)

using simple, inexpensively manufacturable and less fault-prone components.

The difference message passing and intelligent communication and the advantages of the latter can be explained by the following example. All the processors act in collegial manner, i.e. all the processors wish together to produce a book with several tables, but each of the processors can only calculate certain of the tables. After calculation has taken place all the tables are to be interchanged between the processors, so that each processor is able to utilize the information obtained by its colleagues. In the case of simple message passing or information transmission, each of the processors produces copies of the data which it has worked out and supplies same as a data packet to its colleagues. These copies are provided with the reception addresses of each processor. The network acts as a postal delivery service and switches the addressed data packets. Each processor then receives a large number of data packets, which it arranges in a processable order. This sequencing in a first approximation rises linearly with the number of participating processors, i.e. the management costs even in the case of a rapid transfer of the data soon become higher than the actual computing costs for producing the tables. In this case the computing capacity of the overall system is not increased by adding more processors and it can in fact decrease. This is where the present invention comes in. The management of the communication is transferred to the network, hence the name intelligent communications system. A further advantage is that the administration now ensures that from each processor is removed its data packets and that the data packets for all the processors are appropriately sequenced, copied and the to each, correct portions sent, portions being parts of data packets. The management costs of the information interchange for the processors are consequently minimized.

However, the intelligent communications system can not only be used for sequencing and despatching of information to be interchanged between individual processors, but is also suitable for processing said information. For this purpose the communications network has one or more arithmetic units, which are e.g. used by a group or all of the processors, so that data from the communications network can be fed into an arithmetic unit without for this purpose a call or external instruction being needed. In this way calculations such as the determination of the minimum, the maximum, the sum, Z-buffers, etc. can be performed with freely adjustable counter models. The arithmetic unit can be under the control of one, several or all the processors with the same or different priorities, but the communication and control of this calculation take place autonomously.

Finally, the intelligent communications system can be used as a rapid operating system. In analogy to the arithmetic unit, the communications system has for this purpose one or more operating mechanisms, which can e.g. be used by a group of or all the processors, so that data from one or more processors are fed into an operating mechanism, without requiring a call or external instruction and said data are distributed in the same way, i.e. autonomously to one or more processors.

BRIEF DESCRIPTION OF THE DRAWINGS

The invention is described in greater detail hereinafter relative to embodiments concerning an intelligent communications system according to the invention and the attached drawings, wherein.

DESCRIPTION OF THE PREFERRED EMBODIMENTS

Figure 1:
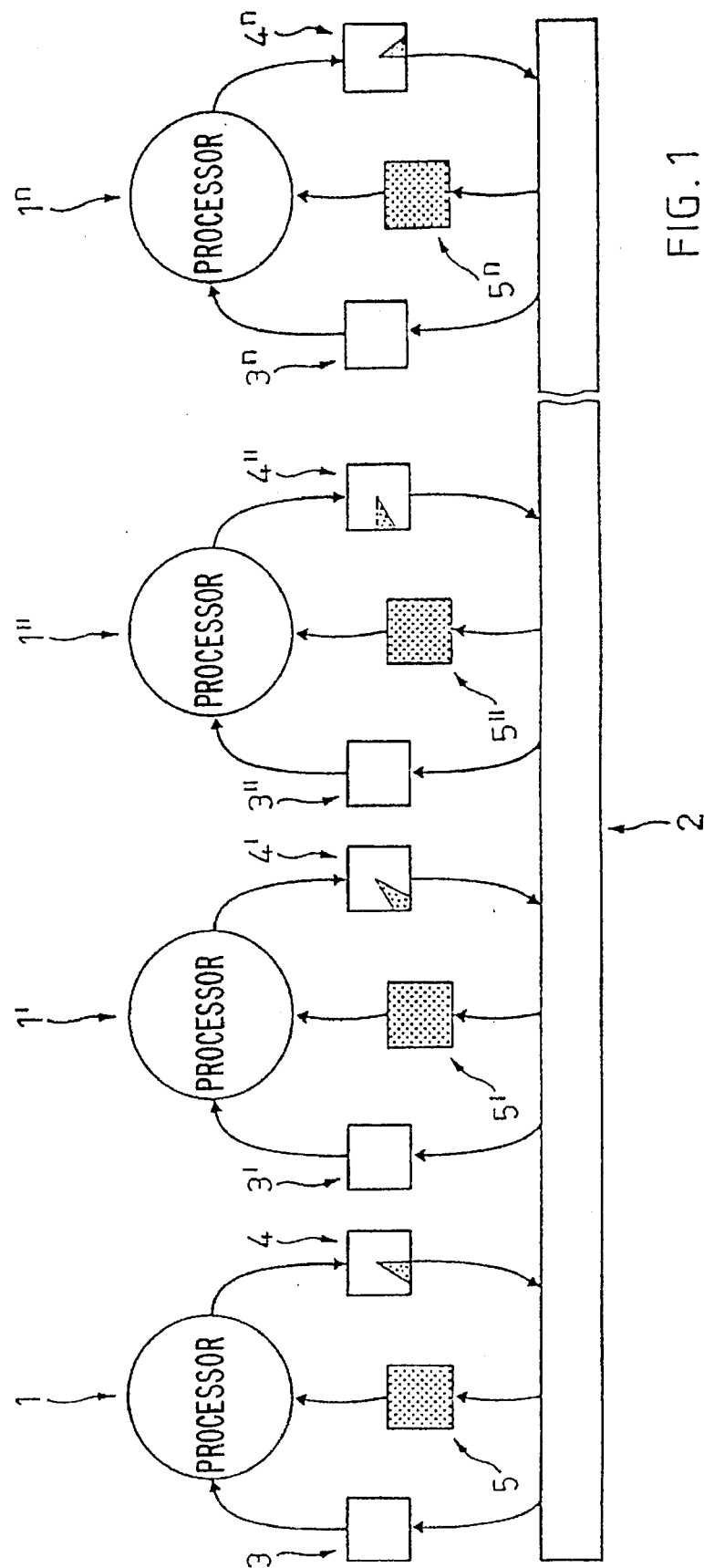
FIG. 1 is a block diagram of a first embodiment of a communications system according to the invention.

FIG. 1 shows in block diagram form a first embodiment of the architecture of the communications system according to the invention. The communications system is intelligent and operates autonomously, i.e. at the start of the meeting the communications system is supplied with the necessary documents for a communication. Thus, it understands the information supplied by the individual participants, can group them together and pass items of information on to other participants. This parallel-communicating communications system for multiprocessors systems is consequently programmable. According to FIG. 1 several processors $1, 1', 1''$ to $1^n$ are connected permanently and in parallel to a communications system 2, n being a positive integer. The communications system 2 can have a linear, branched or ring-like structure. Each of these processors acquires its individual algorithm for developing a common program prior to its implementation by the communications system 2 written into individual memories. In addition, each processor receives an original, individual data set and individual protocol instructions prerecorded in individual memories. During the meeting, which begins and ends at specific times, in accordance with protocol instructions beforehand and in fixed sequence by means of the communications system, only data are read in and out. The common communications system is programmable as a whole with an overriding body of execution instructions and can be operated autonomously in accordance with the execution instructions. Prior to the communication, the individual processors receive individual algorithms, data sets and protocol instructions fed into their memories, they process the data sets with algorithms in an independent manner, calculate individual results and communicate these individual results in data form and, in accordance with the protocol instructions, in autonomous manner to all the other processors.

The forwarding of instructions, orders, algorithm sequences, etc. to the individual processors and the communication of individual results as data among the individual processors can be transmitted in time-separated manner. The communications system is autonomous. The control of the communication is freely determinable, can take place centrally, i.e. from one or more processors and can be implemented in hierarchic manner. The algorithms, data and protocol instructions supplied before the meeting are e.g. supplied by one or more controlling processors to the other processors, but this hierarchy is set aside during the meeting. Each of the processors $1, 1', 1''$ to $1^n$ is so autonomous or independent in accordance with its individual set of instructions, orders, algorithm sequences, etc., that an arbitration, arbitration court or decision as to when who communicates with whom and how is unnecessary. The instruction dependence of the processors exists, but is no longer present in external form during the communication and is instead internally intensified according to the protocol instructions prior to the communication by the processors. This differentiates the communications system 2 according to the invention from the known systems, because typically on such systems communications times and the size of packets of communications are externally fixed.

Each of the processors 1, 1', 1" to $1^n$ receives via the intelligent communications system 2 data 3, 3', 3" to $3^n$ and produces new data 4, 4' 4" to $4^n$. The newly produced data 4, 4' 4" to $4^n$ are distributed by the intelligent communications system 2 in a further, time-following communications process in the form of data 5, 5' 5" to $5^n$ to the processors 1, 1', 1" to $1^n$. In order to illustrate this the intelligent communications system according to FIG. 1 at a specific time distributes data 3, 3', 3" to $3^n$, shown as empty data blocks, to processors 1, 1', 1" to $1^n$. For example, twelve processors in a process calculate individual results or data packets 4, 4' 4" to $4^n$, each of these being shown as a block filled 1/12 with data. The intelligent communications system combines these different 1/12 filled data blocks to form a completely filled data block and passes it on at a later time as data 5, 5', 5" to $5^n$, shown as completely filled data blocks to the processors 1, 1', 1" to $1^n$. Thus, the circle is closed and, in accordance with the individual algorithm present in the individual memory of each of the processors, said data 5, 5', 5" to $5^n$ are further processed by each processor 1, 1', 1" to $1^n$, combined again by the intelligent communications system and then at a specific time redistributed as new data to the individual processors.

However, the communications system can also simultaneously calculate, i.e. it can feed data into one or more jointly used arithmetic units without a call or external instruction being necessary. This arithmetic unit can be used by all the processors. In this way calculations such as the determination of the minimum, the maximum, the sum, Z-buffers, etc. can be performed with freely adjustable counter models. According to FIG. 1, a number such as twelve processors 1, 1', 1" to $1^n$ calculate in a process different individual results or data packets 4, 4' 4" to $4^n$ and e.g. calculate together the same data block. The intelligent communications system superimposes these data blocks, calculates therefrom e.g. minima, maxima, sums, etc. and supplies the data 5, 5', 5" to $5^n$ obtained at a later time e.g. as completely filled data blocks to processors 1, 1'; 1" to $1^n$.

However, the communications system can also be used as an operating system, i.e. one or more operating units can be used by one or more processors for feeding in data. One or more operating units distribute data to one or more processors. This distribution takes place to those processors which are able to receive data. Distribution takes place without any external instruction. According to FIG. 1, for example, twelve processors 1, 1', 1" to $1^n$ in one process transmit data packets 4, 4' 4" to $4^n$ to an operating unit, which distributes the data packets to those processors able to perform a data processing. This control also takes place in autonomous manner through the communications system. It is naturally possible with the communications system to supply unconverted data as 5, 5', 5" to $5^n$ e.g. as partly filled data blocks to the processors 1, 1', 1" to $1^n$. With the knowledge of the present invention the expert has numerous available implementation possibilities. For example, in a specific implementation, data are only received from one or more processors if they satisfy criteria predetermined by the operating unit. Such criteria can be data windows and details or portions in data packets.

Figure 2:
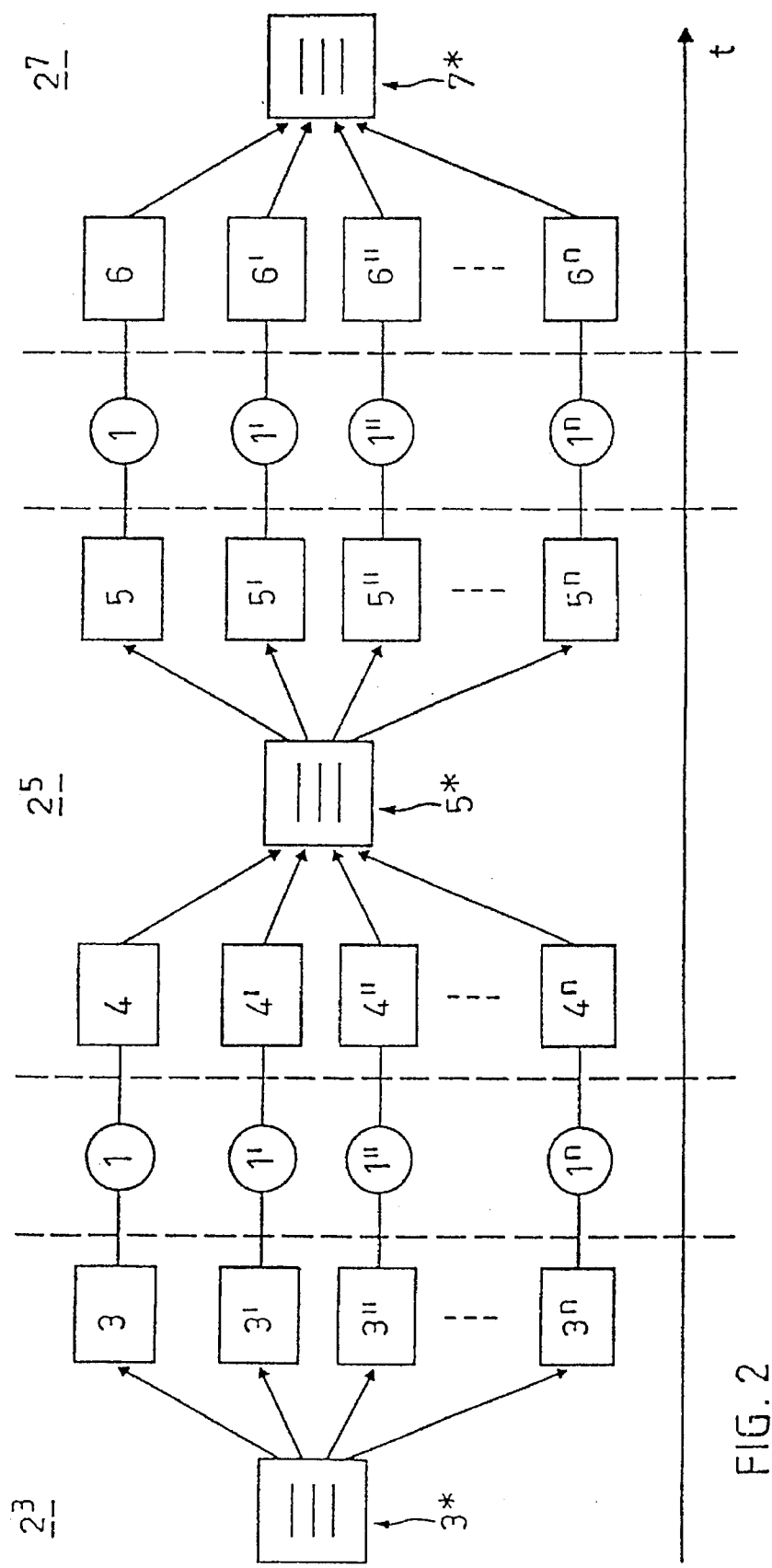
FIG. 2 is a timing chart of the communications process for a communications system in an embodiment according to FIG. 1.

FIG. 2 is a timing chart of the communications process for a communications system in an embodiment according to FIG. 1. The intelligent communications system has written into the memories for the individual processors their individual algorithm sequences and protocol instructions. The data exchange commences at the start of the time arrow t on the left-hand side of FIG. 2. At a specific time the individual processors 1, 1', 1" to $1^n$ are supplied by the communications system 2 with the data 3, 3', 3" to $3^n$ to be processed from a data block 3*. The communications system 2 is in state $2^3$. These processors execute their individual algorithms and at a later time supply their individual results 4, 4' 4" to $4^n$ to the communications system 2. The communications system 2 is in state $2^4$ and receives the data 4, 4' 4" to $4^n$. from the individual processors 1, 1', 1" to $1^n$. These data or data packets 4, 4' 4" to $4^n$ are combined together by the intelligent communications system 2 to form a virtual data block 5* and these or parts of them can be subsequently distributed to the processors. These data communications processes can be repeated. The data combined into a virtual data block 5* by the intelligent communications system 2 can distribute them at a specific time as data 5, 5', 5" to $5^n$ to be processed to the processors 1, 1', 1" to $1^n$. The communications system is in state $2^5$ and transmits data 5, 5', 5" to $5^n$ to the individual processors 1, 1', 1" to $1^n$. The individual results 6, 6', 6" to $6^n$ of the individual processors are then again collected by the communications system 2 and once again combined into a virtual data block 7*. The intelligent communications system 2 is then in state $2^7$.

The data packets produced can have a constant size or different sizes. Thus, e.g. a data set representing an image can be subdivided linewise or blockwise (also with different block sizes). In an advantageous embodiment it is possible to conceive constant or flexible windows, in which an individual processor transmits or receives data. The window lengths can be freely adjusted for each of the processors.

If calculation takes place in the intelligent communications system, then the data fields can time-overlap during transmission. For each data point a corresponding function is performed in the arithmetic unit, e.g. at a minimum function the minimum of the corresponding function is calculated, etc. With the knowledge of the present invention the expert has available to him numerous ways of implementing such transfers.

There are numerous possibilities of synchronizing together the communication and the processing:

a) The individual processors produce individual data 4, 4' 4" to $4^n$, which are transferred as a block to the communications system 2 and the processors wait until all the data 5, 5', 5" to $5^n$ to be processed have reached the processors 1, 1', 1" to $1^n$.

b) The individual processors produce individual data 4, 4' 4" to $4^n$, which are individually transferred to the communications system 2 and the processors wait until all the data 5, 5', 5" to $5^n$ to be processed have reached the processors 1, 1', 1" to $1^n$.

c) The individual processors produce individual data 4, 4' 4" to $4^n$, which are transferred as a block to the communications system 2. As soon as certain of the data 5, 5', 5" to $5^n$ to be processed have reached the processors 1, 1', 1" to $1^n$, they commence the further processing.

d) The individual processors produce individual data 4, 4' 4" to $4^n$, which are individually transferred to the communications system 2. As soon as certain of the data 5, 5', 5" to $5^n$ to be processed reach the processors 1, 1', 1" to $1^n$, the latter start the further processing.

It is also possible to vary the packet sizes of the communications system transfer. Thus, individual processors can communicate with individually fixed packet sizes prior to the communication. Thus, as a function of needs, the technically maximum transmission bandwidth can be completely utilized or broken down into several transmission channels, so that there is e.g. a simultaneous transmission and reception (cf. description according to FIG. 5). In the same way as the time of the communication of each processor can be modified during the communication in accordance with the predetermined protocol instructions, the packet size of the transmission of each processor can be modified during the communication.

Figure 3:
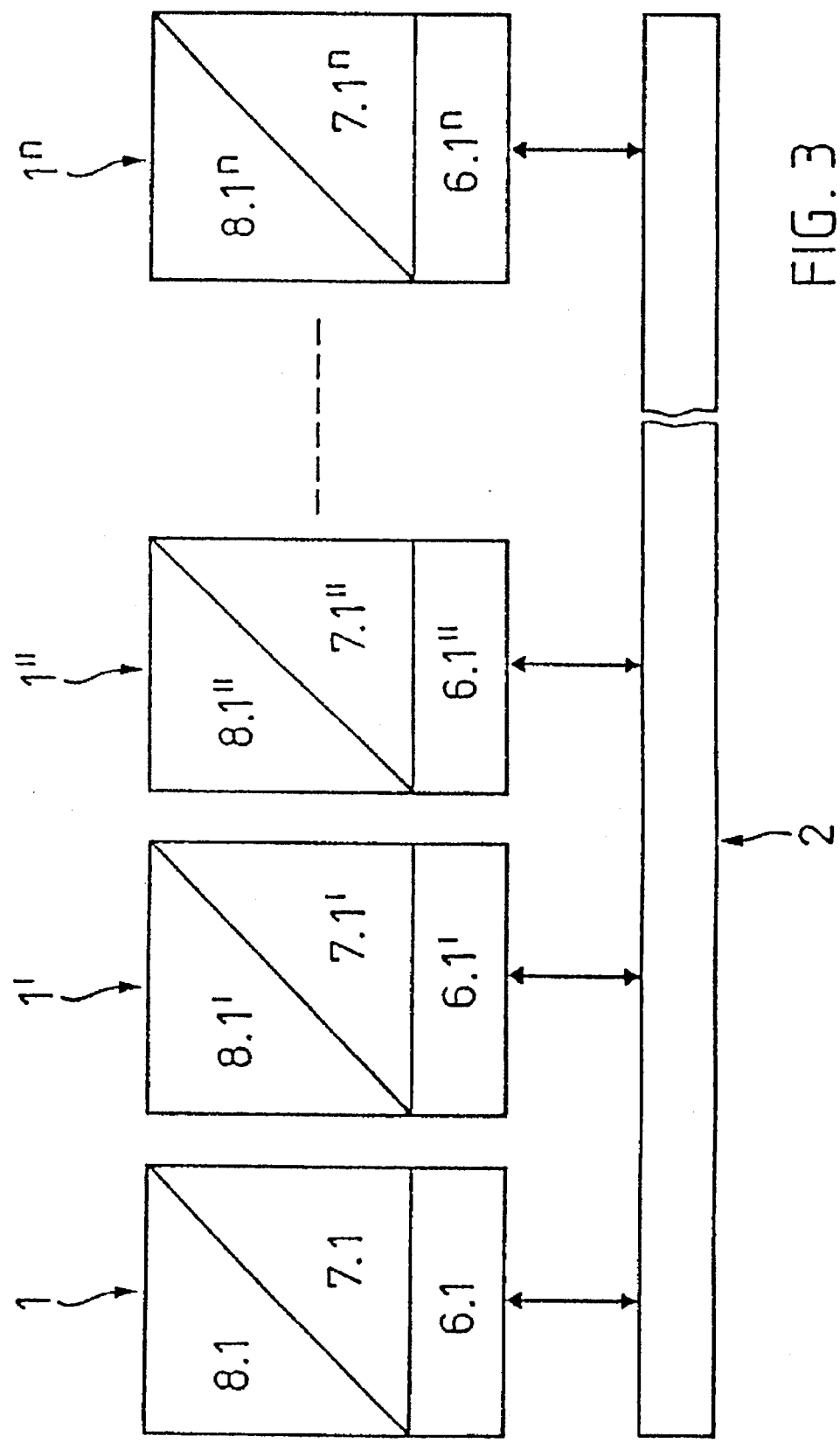
FIG. 3 is a schematic block diagram of parallel operating processors with a communications system according to the invention.

FIG. 3 is a schematic block diagram of parallel-operating processors in the communications system according to the invention. In an advantageous embodiment the individual processors $1, 1', 1''$ to $1^n$ are fast processors. Each of these processors has a communications controller $6.1, 6.1', 6.1''$ to $6.1^n$, as well as two memories $7.1, 7.1', 7.1''$ to $7.1^n$ and $8.1, 8.1', 8.1''$ to $8.1^n$. The communications controllers $6.1, 6.1', 6.1''$ to $6.1^n$ organize the access to the memories $7.1, 7.1', 7.1''$ to $7.1^n$ and $8.1, 8.1', 8.1''$ to $8.1^n$ between the processors $1, 1', 1''$ to $1^n$ and the communications system 2. The communications controllers can have individual constructions or several communications controllers can be combined on a module, e.g. a chip. The memories $7.1, 7.1', 7.1''$ to $7.1^n$ are data memories e.g. video-DRAMs, the memories $8.1, 8.1', 8.1''$ to $8.1^n$ are instruction memories, e.g. SRAMs. Advantageously the data memories $7.1, 7.1', 7.1''$ to $7.1^n$ and instruction memories $8.1, 8.1', 8.1''$ to $8.1^n$ have two inputs, one for the processor and one as the interface to the communications system. Equipped in this way e.g. one processor 1 can process data and access its data memory 7.1, without disturbing the switching of new data to be processed via the interface from the communications system 2. The opening and closing of the two inputs of the data memories 7.1 is then controlled via the communications controller 6.1.

If calculation is taking place on one or more arithmetic units in the communications system 2, then said units (comparators, summators, arithmetic logic unit, etc.) are in the communications controllers $6.1, 6.1', 6.1''$ to $6.1^n$. The arithmetic unit in the communications controller can also be used for controlling a task acceptance. For example, a communications controller can only accept a task if a data value is within a certain expected value predetermined by the processor. If a rapid operating system is operated in the communications system 2, the processors $1, 1', 1''$ to $1^n$ indicate to the communications controllers $6.1, 6.1', 6.1''$ to $6.1^n$ the time as from which they are ready for data acceptance. The communications controllers $6.1, 6.1', 6.1''$ to $6.1^n$ then fetch a task from the communications system 2.

Figure 4:
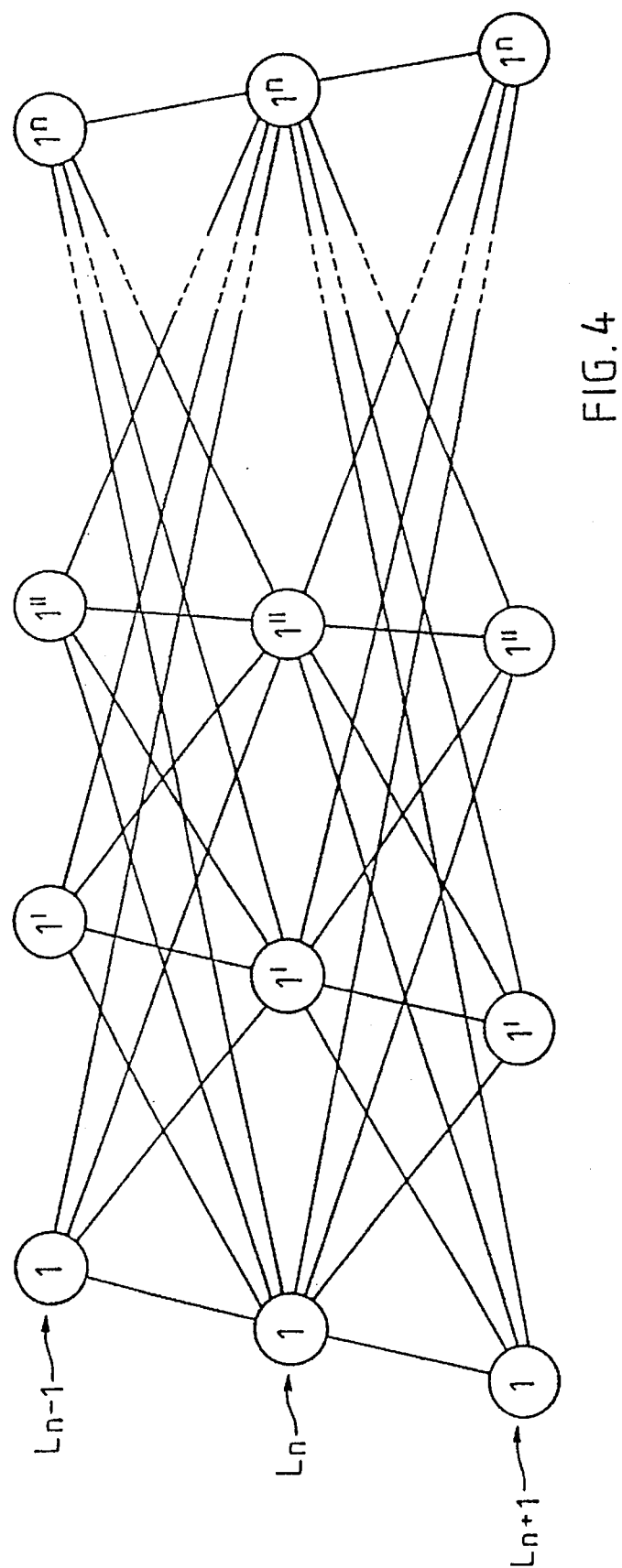
FIG. 4 is a diagrammatic model of a multilayer perception implemented with a communications system according to the invention.

FIG. 4 is a diagrammatic model of a multilayer perception (neuronal network) implemented with the communications system according to the invention. The multilayer perception is an example of a parallelizable application. It is a universal learning model, which represents the development of values in a plurality of layers $L_{n-1}, L_n, L_{n+1}$ (n is a positive integer) in accordance with an algorithm. Starting from an initial value, which is predetermined in a layer $L_n$, through the layers in the forward direction (n+1) the calculation takes place and, of a final value and in the reverse direction (n-1) through the layers, the calculation of an original value takes place. In order to do this, the individual processors $1, 1', 1''$ to $1^n$ in each layer calculate parallel result sets and communicate them with one another before the values of a next layer are calculated. This communication of result sets is represented by the lines linking the individual processors $1, 1', 1''$ to $1^n$ of adjacent layers. Corresponding to the large number of processors and the complexity of the calculations, the result sets can be large, i.e. their communication can rapidly become the speed-determining step in implementing the algorithm.

The advantage of the communication system 2 according to the invention is that it is programmable and that prior to the start of the implementation of the perceptron algorithm the individual processors $1, 1', 1''$ to $1^n$ receive in their data memories $7.1, 7.1', 7.1''$ to $7.1^n$ and instruction memories $8.1, 8.1', 8.1''$ to $8.1^n$ their individual algorithms or computing software, specific data sets necessary for implementation thereof, as well as protocol instructions (e.g. their individual communications times and transmission bandwidths). Thus, during the implementation of the algorithm they are able to operate independently in accordance with their individual software. On the basis of the protocol instructions they know when they are to transmit and receive results and also know how to independently update their own data sets with these results.

Thus, the intelligence of this communications system is that during the implementation of the algorithm only a minimum of data is communicated and that it functions substantially autonomously. The previously transferred protocol instructions lead to a hierarchy-free communication. The autonomy is that a timetable or schedule with communications packet sizes between the individual processors are fixed prior to the communication in accordance with the protocol instructions. Minimized means that individual data values, which must be supplied to several other processors, only load the communications system once. All processors interested in this specific data value make a copy thereof. In accordance with the protocol instructions the communications controllers consequently know, e.g. by counting the communicated data values, when they are to participate in a communication and need not as is conventionally the case be requested by a higher instance or authority to do this and also do not have to keep the communications line open for an unnecessarily long period of time and also wait. Thus, there is no need for time-consuming arbitration. According to FIG. 3 this opening and closing of the inputs of the data memories $7.1, 7.1', 7.1''$ to $7.1^n$ is controlled via the communications controllers $6.1, 6.1', 6.1''$ to $6.1^n$ of the individual processors $1, 1', 1''$ to $1^n$. The data lengths and communications times are consequently minimized and are therefore short and known.

The communications system is programmable and as a result of the transfer of software, data and protocol instructions to the participating processors before the actual communication it is not only rapid, but also flexible. The hardware used, namely processors with data memories and communications controllers leads to a rapid communication, because to the communications system are only directed the accesses to the data memories and which can be opened and closed in rapidly timed manner. What changes between individual applications, namely the software and data, are transferred to the processors before the actual communication, which ensures the general use scope.

Figure 5:
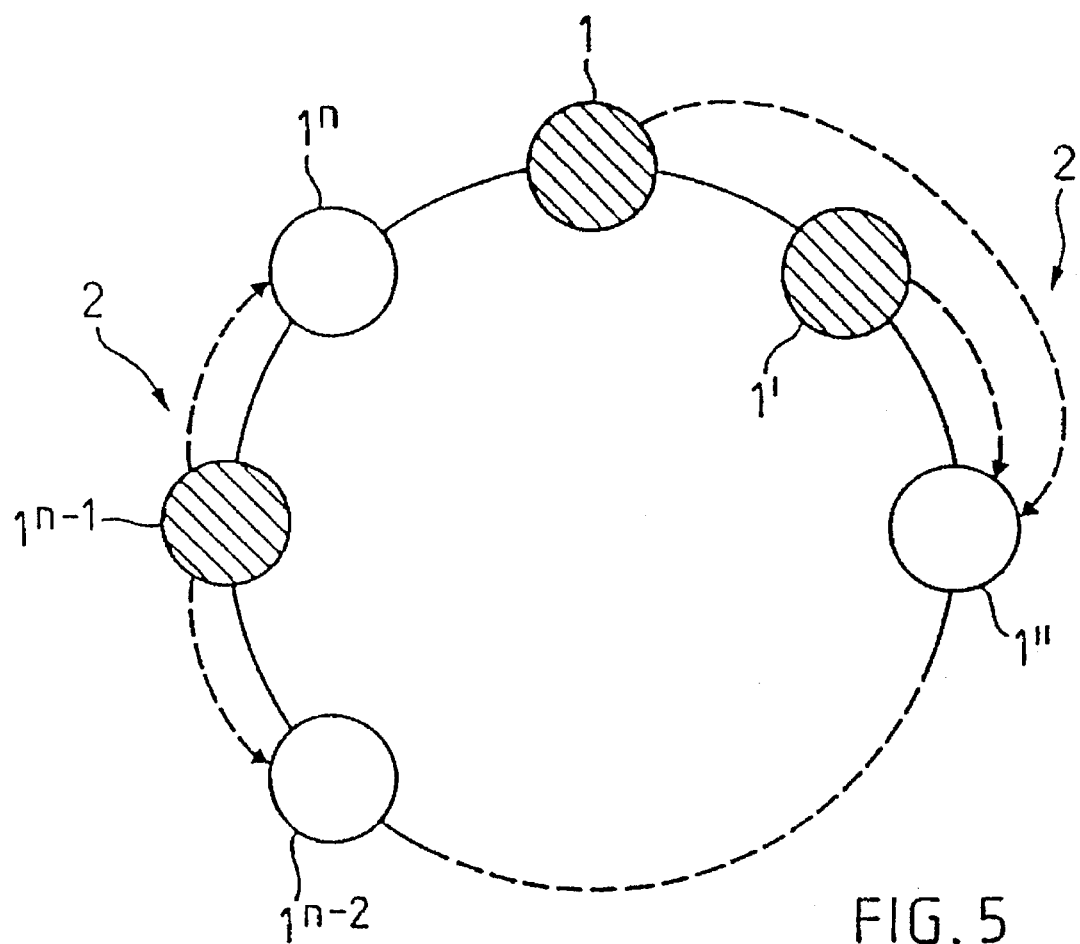
FIG. 5 is a block diagram of a second embodiment of the architecture of a communications system according to the invention with data sources and data sinks.

FIG. 5 shows in block diagram form a second embodiment of the architecture of the communications system according to the invention with data sources and data sinks. The communication takes place here according to a ring structure, the communications system 2 linking the individual processors $1, 1', 1''$ to $1^n$ in a closed ring. Unlike in a linear matrix or tree structure, ring structures allow simultaneous access to data. They are able to operate with higher data rates than e.g. conventional bus-based or linear communications systems, because here a single transmitter forwards informations to an individual, known recipient, which is easier to carry out from the circuitry standpoint. They are consequently faster and can be operated over greater distances. In principle, linear, matrix or tree structures are also possible. A linear structure may be more easy to implement for small systems in a constricted space. The individual communications controllers are then linked in a bus with a linear matrix. With the knowledge of the invention numerous variants are available to the expert.

In the embodiment according to FIG. 5 the individual processors $1, 1', 1''$ to $1^n$ are equipped with data memories $7.1, 7.1', 7.1''$ to $7.1^n$ and instruction memories $8.1, 8.1', 8.1''$ to $8.1^n$ and via communications controllers $6.1, 6.1', 6.1''$ to $6.1^n$ participate in the communication (cf. description according to FIGS. 1 to 3). Prior to the actual communication, the exchange of calculated results as data between all the processors $1, 1', 1''$ to $1^n$, they are supplied with the individual computing software, the data sets necessary for the calculation, as well as the protocol instructions and communications packet sizes. The intelligence of the communications system is that the communication between the individual processors can be minimized and implemented in an optimum, ultra-fast manner.

During the execution of the data according to the individual algorithms results are obtained as data to be communicated and the distribution thereof via the individual processors can be referred to as data sources and sinks. The term data sources is used for the "full" memories of the dark, hatched processors $1, 1', 1''$ to $1^n$, while the data sinks are the "empty" memories of the light, unhatched processors $1, 1', 1''$ to $1^n$. For example, at the time shown in FIG. 5 a communication is taking place via the communications system 2 between the processors $1, 1'$ and $1''$, the processors 1 and $1'$ simultaneously transferring data to the processor $1''$ by means of different sized packets. The processor $1^{n-1}$ simultaneously transmits data to the processors $1^{n-2}$ and $1^n$. Other than e.g. in the demultiplexed token ring, where transmission authorization of the processors participating in the communication is given in order, in the communications system according to the invention it is possible to have multiplexing, a simultaneous access to data from several processors. This is due to the high flexibility of the individual protocol instructions. Due to the fact that these protocol instructions are only restricted to the communication of data, but do not e.g. have to hierarchically, externally call up the communicating processors, the transmission bandwidth, corresponding to the size of the data to be communicated, can be subdivided into several, narrower and independent transmission channels. The direction of the communication is not predetermined, so that the processor $1^{n-1}$ communicates in opposition with the processors $1^{n-2}$ and $1^n$. Sequence and direction changes are naturally also possible during a communication.

In another embodiment a communications system according to the invention in an arrangement according to FIGS. 1 to 5 can be looked upon as a hyperprocessor. This can once again be provided with intelligent communications controllers for communication with other communications systems. Several such hyperprocessors can be coupled together in accordance with the above description, which gives a hyper-hyperprocessor and this can be repeated ad infinitum. This makes it possible to construct a very large and correspondingly powerful supercomputer. Such hyperprocessors have the wide range of possible architectures described hereinbefore. Thus, in an advantageous embodiment several ring-like communications systems can be coupled together in such a way that they can communicate with one another via intelligent communications controllers and one hyperprocessor becomes the master, in the sense of the server/client architecture. Naturally, in other embodiments, other and differently structured architectures can be coupled together, e.g. linear, matrix or tree structures of hyperprocessors. With the knowledge of the present invention the expert has a large number of variants available to him.

What is claimed is:

1. A method for interconnecting and operating in parallel a plurality of data processors comprising the steps of providing a plurality of autonomous data processors each having a data memory, an instruction memory and a communication interface, before beginning a data processing sequence, loading memories of the autonomous data processors with individual algorithms, data sets and protocol instructions, providing a hardware communication system common to all of the autonomous data processors, the communication system being connected to communicate with the communication interfaces of all of the data processors to regulate operation of the data processors, programming the communication system with an overriding body of execution sequence commands for the data processors to initiate and sequence autonomous processing of data in the data processors, with the communication system, communicating commands to initiate processing of the loaded data sets in accordance with the loaded algorithms in the data processors, independently of each other, to individually arrive at processing results and make the results available to the communication system, and with the communication system, reading and communicating the processing results.

2. A method according to claim 1 and including transmitting and receiving data by each autonomous data processor independently of each other processor.

3. A method according to claim 1 wherein the processing by each autonomous data processor includes independently updating the data set in the processor with communicated data in accordance with the protocol instructions and processing the updated data set in accordance with the algorithms loaded into the processor memory.

4. A method according to claim 3 and including updating data sets by each autonomous data processor by counting the communicated data.

5. A method according to claim 1 wherein the step of loading memories of each autonomous data processor includes loading in each processor a schedule establishing communication packet size relationships between individual processors in accordance with the protocol instructions loaded prior to communicating commands.

6. A method according to claim 5 wherein the schedule establishes communication packets of identical sizes for the processors.

7. A method according to claim 5 wherein the schedule establishes communication packets of different sizes for the processors.

8. A method according to claim 1 and including establishing with the protocol bandwidths of transmissions between data processors through the communication system prior to the step of communicating commands.

9. A method according to claim 1 wherein the step of reading and communicating the processing results includes multiplexing data access via a plurality of transmission bandwidths.

10. A method according to claim 9 and including dividing transmission bandwidths into independent transmission channels corresponding to the size of data to be transmitted.

11. A method according to claim 1 wherein communication between the autonomous data processors consists of transmitting and receiving data through the communication system.

12. A method according to claim 1 and including communicating modified data from individual data sets as data.

13. A parallel data processing system with communication system control comprising:

a plurality of autonomous data processors each having a data memory, an instruction memory, a communication controller and a communication interface, each said data memory and instruction memory having stored therein data sets, algorithms and protocol instructions, said communication controllers being connected to control opening and closing of access to said data memories through said communication interface; and a hardware communication system common to all of said autonomous data processors, said communication system being connected to communicate with said communication interfaces of all of said data processors to regulate operation of said data processors, said communication system having stored therein an overriding body of execution sequence commands for said data processors to initiate and regulate autonomous processing of data sets in said data processors in accordance with said stored algorithms in said data processors, independently of each other, to individually arrive at processing results and make said results available to said communication system for reading and communicating the processing results.

14. A system according to claim 13 wherein said communication controllers operate independently of said individual data processors and wherein said data processors operate independently of opening and closing of access to said data memories and communication through said communication interfaces.

15. A system according to claim 13 wherein a plurality of communication controllers are mounted together on a module.

16. A system according to claim 13 and including data communication means for interconnecting said communication controllers of said processors in a closed ring.

17. A system according to claim 16 wherein said data communication means comprises a bus.

18. A system according to claim 13 wherein at least one communication controller comprises an arithmetic unit, at least one said data processor being connected to autonomously deliver data to said arithmetic unit for calculation independently of other processes in said system.

19. A system according to claim 18 wherein a plurality of said arithmetic units comprise arithmetic units interconnected to perform calculations jointly, and wherein a plurality of data processors are connected to have access to said arithmetic units.

20. A system comprising a plurality of systems according to claim 13 each including communication controllers in addition to said communication controllers associated with said processors to form a hyperprocessor in communication with additional hyperprocessors.

21. A system according to claim 13 wherein the system includes an arithmetic unit accessible to said hardware communication system and to each of said autonomous data processors for calculation of intermediate results in response to said internally stored algorithms and internal instructions.

* * * * *